United States Patent
Iwamoto et al.

(10) Patent No.: US 9,079,559 B2
(45) Date of Patent: Jul. 14, 2015

(54) AIRBAG DEVICE

(71) Applicant: NIHON PLAST CO., LTD., Fujinomiya-shi, Shizuoka (JP)

(72) Inventors: Hiroyuki Iwamoto, Fujinomiya (JP); Yohei Kiuchi, Fujinomiya (JP); Takahiro Yamauchi, Fujinomiya (JP); Hideaki Saito, Fujinomiya (JP); Hideki Mochizuki, Fujinomiya (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 0 days.

(21) Appl. No.: 14/093,088

(22) Filed: Nov. 29, 2013

(65) Prior Publication Data
US 2014/0151989 A1 Jun. 5, 2014

(30) Foreign Application Priority Data

Nov. 30, 2012 (JP) ................................. 2012-263586
Feb. 21, 2013 (JP) ................................. 2013-032480

(51) Int. Cl.
*B60R 21/239* (2006.01)
*B60R 21/2338* (2011.01)

(52) U.S. Cl.
CPC ........... *B60R 21/239* (2013.01); *B60R 21/2338* (2013.01); *B60R 2021/2395* (2013.01); *B60R 2021/23382* (2013.01)

(58) Field of Classification Search
CPC ................. B60R 21/2338; B60R 2021/23382; B60R 2021/23384; B60R 21/239; B60R 2021/2395
USPC ........................................................ 280/743.2
See application file for complete search history.

(56) References Cited

FOREIGN PATENT DOCUMENTS

| JP | 2012066655 A | * | 4/2012 |
| JP | 2012-166685 A | | 9/2012 |
| JP | 2012166685 A | * | 9/2012 |

* cited by examiner

*Primary Examiner* — Ruth Ilan
*Assistant Examiner* — Timothy Wilhelm
(74) *Attorney, Agent, or Firm* — Marvin A. Motsenbocker; Mots Law, PLLC

(57) ABSTRACT

An airbag includes a vent hole discharging gas, a slide tether performing transition of a state of the vent hole, from an open state via a close state to the open state, by changing between a slackened state and an extended state, and a slide tether cover guiding the slide tether. The other end portion in a longitudinal direction of the slide tether body portion constitutes a first supporting point by being fastened in a direction going from the vent hole toward a mounting position of the inflator, bifurcated portions constitutes a second supporting point by the other end portion of the slide tether cover being fastened, terminal end portions of leg piece portions constitute a third supporting point by being respectively fastened. When the airbag is deployed, transition of a state of the vent hole is performed.

3 Claims, 15 Drawing Sheets

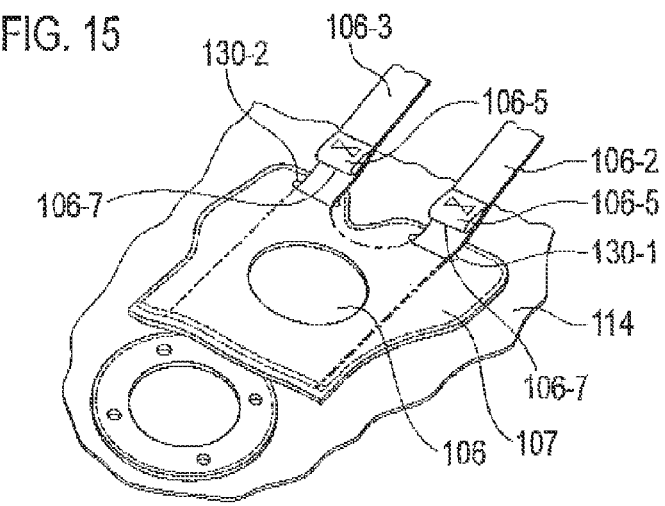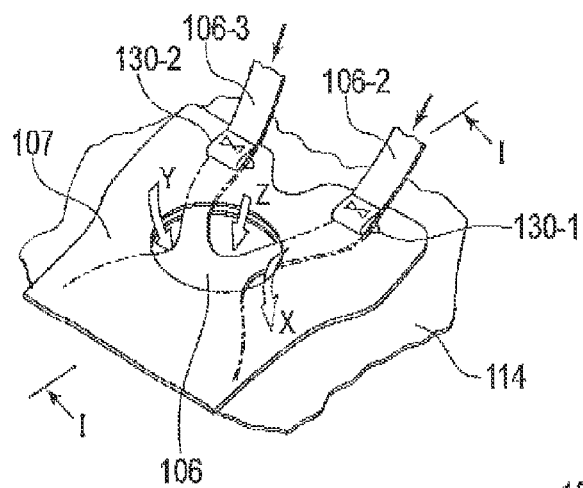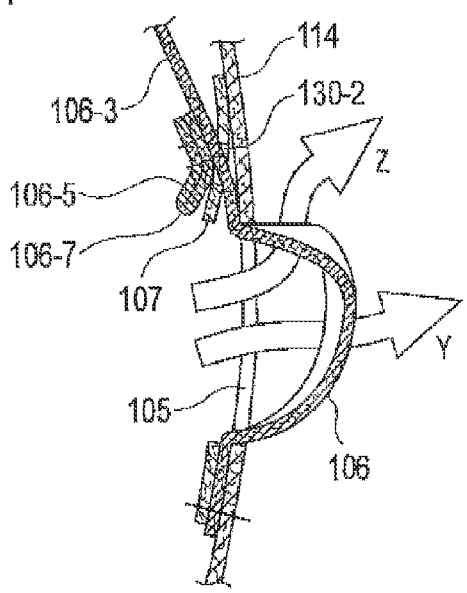

AIRBAG DEVICE

BACKGROUND OF THE INVENTION

1. Field of the Invention

The present invention relates to an airbag device.

2. Related Background of the Invention

There has been widely used an airbag device which relieves an impact applied to an occupant and protects the occupant by sensing the impact at the time of a vehicle collision, injecting gas generated from an inflator (a gas generator) into an airbag, and deploying the bag to thereby interpose the airbag between the occupant and a vehicle body. In recent years, in order to protect the occupant from the impact at the time of the collision of the vehicle, the airbag device has been included as standard equipment in a vehicle such as a motor vehicle.

As the airbag device, in addition to the airbag device which protects a driver and an occupant in a passenger's seat, various types of airbag devices are put to practical use, for example, for protecting an occupant in a rear seat, protecting a pedestrian, protecting an occupant's head from the impact at the time of a side collision or a rolling over of the vehicle, and the like. Furthermore, a shape of the airbag is designed to fit for installation position or intended use.

Many airbag devices are configured such that a pouch shaped airbag is deployed by high-pressure gas generated from a gas generator such as an inflator, at a time of the collision of the vehicle, and impact such as collision is absorbed and relieved by the airbag, as mentioned above. In this way, the configuration for protecting the occupant from impact or the like is employed in the airbag.

The airbag device is configured such that the airbag is deployed instantaneously by the high-pressure gas which is jetted out of the inflator, and then a pressure inside the airbag is adjusted by appropriately releasing the gas inside the airbag in a stage of restraining, thereby effectively constraining the occupant.

As a method of moderately letting out the gas in the inner portion of the airbag, a technique of forming a vent hole for discharging the gas in an airbag main body has been employed. As a configuration of an exhaust portion via the vent hole, various techniques have been conventionally proposed. For example, there have been proposed an airbag device or the like in which the gas discharge is suppressed by increasing an air-flow resistance from the vent hole in the initial stage of the deployment of the airbag, and the vent hole can be fully opened in the later stage of the deployment, and an airbag which can effectively protect a head portion of an occupant in whichever of a case where the occupant fastens the seat belt and a case where the occupant does not fasten the seat belt in a configuration in which the vent hole is opened and closed by using a tether.

Furthermore, in this kind of conventional vehicular airbag device, there has been known an airbag device configured such that an inflating shape of the airbag or an inflating gas pressure (an internal pressure) in an inner portion of the airbag can be appropriately selected, while taking into consideration whether a seating position of the occupant is near the airbag or away from the airbag in order to capture and protect the occupant effectively, in the case where the airbag is deployed by the inflating gas which is jetted out of the inflator by sensing an impact of a vehicle collision. One of the airbag is referred to as a so-called accumulator-type airbag, and the other airbag is referred to as a variable displacement-type airbag.

The accumulator type airbag and the variable displacement type airbag are both constituted such that a vent hole is provided in a base cloth constructing the airbag, and an inflating gas pressure of the inner portion is adjusted by appropriately opening and closing the vent hole.

In addition, among the above-mentioned two types of airbags, the accumulator-type airbag allows the inflating gas to be discharged by opening the vent hole in the initial stage of the deployment, to thereby reduce the impact of the occupant being seated in a state in which the occupant is near the airbag, and allows the airbag to be further deployed from the initial stage of the deployment in the case where the occupant is seated while being away from the airbag, and suppresses the discharge of the inflating gas by closing the vent hole or making the opening of the vent hole small during the process of the deployment and achieves an early deployment, thereby reliably capturing and protecting the occupant having been spaced therefrom.

On the other hand, the variable displacement-type airbag is configured such that vent holes are formed in a pair of base fabrics constituting the airbag, and the vent holes are opened during the process of the deployment of the airbag by gas (inflating gas) generated by an inflator at a time of the vehicle collision. For this purpose, the variable displacement-type airbag is configured such that a pair of overlapping base cloths are joined by a separable joint and the joint can be separated by a load when the airbag deploys, and furthermore, an end portion of a vent hole cover closing the vent hole is joined by the joint near an outer peripheral portion of the airbag, and the end portion of the vent hole cover is separated from the base cloth by separating the joint so as to open the vent hole.

PRIOR ART DOCUMENT

Patent Document

[Patent Document 1] Japanese Patent Application Laid-Open Publication No. 2012-166685

SUMMARY OF THE INVENTION

A description will be given of a conventional vehicular airbag device with reference to FIGS. 18, 19, 20A, 20B and 20C. FIG. 18 is a partly broken schematic perspective view illustrating a conventional airbag in a state of deployment together with an inflator, an airbag cover and a back plate in an exploded state, and FIG. 19 is a plan view illustrating the airbag shown in FIG. 18 in a partly broken state. Further, FIGS. 20A, 20B and 20C are explanatory views illustrating a state of deployment of the conventional airbag, in which FIG. 20A is the view showing an initial state of deployment of the airbag in the case where an occupant is near the airbag, FIG. 20B is the view showing a full deployment state reaching from the state in FIG. 20A by progress of the deployment of the airbag in the case where the occupant is away from the airbag, and FIG. 20C is the view showing a state in which the airbag captures and protects the occupant by discharging a part of the inflating gas to state of full deployment in the case where the occupant comes into contact with the airbag, under the full deployment state of the airbag shown in FIG. 20B.

In FIG. 18, a vehicular airbag 901 described in the Patent Document 1 is constituted such as to be deployed by inflating gas which is jetted out of an inflator 902 so as to capture and protect an occupant 910 (FIGS. 20A, 20B and 20C) in the case where an impact of collision or the like is applied to a vehicle not shown. For this purpose, the airbag is constructed by joining a first face-constituting base fabric 911 which faces a side of the occupant 910, and a second face-constituting base fabric 912 which faces a side opposite to the occupant in their outer peripheral positions, for example, by an adhesive bonding or a sewing by a lock stitch so as to form a bag shape.

In addition, at the normal time of the vehicle which is not shown, the airbag, in a state of being folded into an appropriate shape, is installed in a vehicle body side such as, for example, a steering wheel not shown in a state in which the airbag is accommodated in an accommodation chamber formed by an airbag case 903 and a back plate 904. There is mounted, on the second face-constituting base fabric 912, the inflator 902 which is inserted into an inflator insertion hole 912a pierced in a substantially center portion of the second face-constituting base fabric 912, by utilizing a plurality of inflator mounting holes 912b formed so as to surround the inflator insertion hole 912a, by means of bolts not shown.

Furthermore, a vent hole 905 is formed in the second face-constituting base fabric 912, closer to an outer peripheral side than the inflator insertion hole 912a. The vent hole 905 is constituted so as to be opened and closed by a vent hole cover 906.

The vent hole cover 906 is configured so as to have a cover main body portion 906-1 which closes the vent hole 905, and cover leg piece portions 906-2 and 906-3 which are formed so as to be bifurcated from the cover main body portion 906-1. Each of leading end portions of both the cover leg piece portions 906-2 and 906-3 (one end portion of the vent hole cover 906) is sewed to the first face-constituting base fabric 911 with a lock stitch.

A leading end portion of the cover main body portion 906-1 (the other end portion of the vent hole cover 906) is sewed with the second face-constituting base fabric 912 stitched with the lock stitch, for example, after a doubly folded hauling portion 906b is formed. Additionally, a position at which the cover main body portion 906-1 and both the cover leg piece portions 906-2 and 906-3 are branched is constituted in a communication portion 906a communicated with the vent hole 905.

Furthermore, there are formed joints 913 capable of being separated by a predetermined inflating gas pressure in the first face-constituting base fabric 911 and the second face-constituting base fabric 912, closer to an outer peripheral side than the vent hole 905. The joints 913 demarcate and form a small bag portion 914 on an inner peripheral side including the vent hole 905 by spirally carrying out sewing from an outer peripheral portion of the airbag 1 toward the center portion so that a plurality of terminal portions faces each other, for example, as clearly shown in FIG. 19.

Moreover, a guide piece 907 covers the vent hole cover 906 in a state in which the guide piece 907 strides over the cover main body portion 906-1 and the cover leg piece portions 906-2 and 906-3. The guide piece 907 exists on the second face-constituting base fabric 912 side with respect to the hauling portion 906b, and is joined to the first face-constituting base fabric 911 and the second face-constituting base fabric 912 by the joints 913 together with the hauling portion 906b (refer to FIG. 19). In addition, a communication hole 907a communicating with the vent hole 905 via the communication portion 906a is formed in the guide piece 907.

In the conventional vehicular airbag 901 constituted as mentioned above, in the case where the impact is applied by encountering with the vehicular collision accident or the like not shown, an airbag controller (not shown) senses the impact, gives instructions to the inflator 902, supplies the inflating gas into the airbag 901, and inflates and deploys the airbag 901.

In the case where the occupant 910 is comparatively near the airbag 901 when the vehicle encounters the collision accident or the like, the first face-constituting base fabric 911 and the second face-constituting base fabric 912 are joined by the joint 913 capable of being separated by a predetermined inflating gas pressure on the outer peripheral portion side, as the initial stage of the deployment shown in FIG. 20A. Furthermore, the vent hole 905 provided on the second face-constituting base fabric 912 side is not closed but is opened by being communicated with the communication portion 906a of the vent hole cover 906 and the communication hole 907a of the guide piece 907, since the hauling portion 906b of the vent hole cover 906 is joined to the first face-constituting base fabric 911 and the second face-constituting base fabric 912 by the joints 913.

As a result, the airbag 901 is deployed in an early stage in a small volume achieved by the small bag portion 914. Additionally, in the state mentioned above, the inflating gas can be discharged to the outside from the vent hole 905 via the communication portion 906a and the communication hole 907a of the guide piece 907 (refer to an arrow in FIG. 20A), and the occupant 910 near the airbag 901 is reliably and softly captured and protected by an appropriate deflation of the airbag 901 even if he or she comes into contact with the airbag 901.

Furthermore, in the case where the occupant 910 is seated in a state of being comparatively away from the airbag 901 at a time of the encounter with the collision accident or the like of the vehicle, the airbag 901 changes to the state of full deployment by progress of the initial stage of the deployment. In the process of progress mentioned above, in the case where the inflating gas pressure of the inflating gas within the airbag 901 is increased to a predetermined pressure or higher, the sewing constituting the joint 913 is separated, and as a result, the airbag 901 changes to a state of full deployment.

Furthermore, due to the separation of the sewing constituting the joint 913, the hauling portion 906b in the vent hole cover 906 is released, the vent hole cover 906 elongates and performs a pulling action, while being guided by the guide piece 907, and the vent hole 905 is closed by the cover main body portion 906-1 together with the communication hole 907a of the guide piece 907 (the state shown in FIG. 20B).

As a result, the airbag 901 is formed into a deployed shape having a large volume by separating the joint 913, and in the process of progress, reaches a state of full deployment in the early stage to thereby early and reliably capture the occupant 910 having been spaced therefrom, by closing the vent hole 905 or making the opening of the vent hole 905 small through the pulling action of the vent hole cover 906.

Furthermore, in the state of full deployment mentioned above, in the case where the occupant 910 comes into contact with the airbag 901 as shown in FIG. 20C, the airbag 901 is pressed. As a result, the vent hole cover 906 is slackened while being guided by the guide piece 907 through the movement of the inflating gas, and opens the vent hole 905. Accordingly, the inflating gas is discharged to the outside of the airbag 901 as shown by an arrow in FIG. 20C, and the airbag 901 is depressed to follow the shape of the head portion of the occupant 910 as shown in FIG. 20C, and softly protects the occupant 910 having been spaced therefrom.

However, in the conventional airbag 901, the vent hole 905 is closed with a developing direction of the airbag 901 as a starting point. That is, since there is a case where the airbag 901 is configured such that the vent hole 905 is closed after the airbag 901 deploys without changing the exhaust characteristics of the inflating gas and the leading end portion of the cover main body portion 906-1 is released from the folded state, an improvement is continued so that the transition from an "open" state to a "close" state is smoothly carried out, while keeping a basic concept in a series of actions in which the vent hole is changed to an "open" state (letting out the inflating gas in the early stage), a "close" state, and an "open" state, as described in FIGS. 20A, 20B and 20C.

An object of the present invention is to provide an airbag which increases the amount of energy absorption in the early stage of constraining the occupant by enhancing the accumulation pressure of the inflating gas in the early state of the deployment, and which can hold down the output of the inflating gas of the inflator by raising the energy absorption efficiency.

In order to achieve the object mentioned above, the airbag device according to the present invention is an airbag device having a hollow airbag which constrains an occupant by being deployed by gas supplied form an inflator. The airbag includes a first face-constituting base fabric facing to a side of the occupant, and a second face-constituting base fabric facing a side opposite to the occupant. The airbag includes a vent hole which is provided in the second face-constituting base fabric, for discharging the gas, a slide tether which is provided from an inner surface of the second face-constituting base fabric to an inner surface of the first face-constituting base fabric, and which performs transition of a state of the vent hole, from an open state via a close state to the open state, by changing between a slackened state and an extended state, and a slide tether cover which is provided with an opening communicated with the vent hole, one end of which is fastened to the inner surface of the second face-constituting base fabric via a slide tether, and which guides the slide tether.

The slide tether includes a body portion, bifurcated portions which are bifurcated from one end portion in a longitudinal direction of the body portion, and leg piece portions which are respectively extended from the bifurcated portions. The other end portion in the longitudinal direction of the body portion constitutes a first supporting point by being fastened to an inner surface of the second face-constituting base fabric in a direction going from the vent hole toward a mounting position of the inflator. The bifurcated portions constitute a second supporting point by the other end portion of the slide tether cover being fastened to the inner surface of the second face-constituting base fabric, extended terminal end portions of the leg piece portions constitute a third supporting point by being respectively fastened to the inner surface of the first face-constituting-base fabric. When the airbag is deployed, transition of a state of the vent hole is performed based on a force acting in an airbag deploying direction which is generated with the first supporting point and the third supporting point as a starting point, and a force acting, in a direction intersecting with the airbag deploying direction, which is generated with the second supporting point as a starting point.

Furthermore, the airbag device according to the present invention is preferably configured such that the vent hole is provided near an insertion hole of the inflator and a stopper piece can be arranged on the slide tether to restrict its backward motion.

BRIEF DESCRIPTION OF THE DRAWINGS

FIG. 15 is a view explaining the other example of the slide tether including a stopper piece arranged on the slide tether, in the airbag device according to the embodiment of the present invention.

FIG. 16 is a view explaining the other example of the slide tether provided with a stopper piece in the airbag according to the embodiment of the present invention, in the case where slide tether leg piece portions are pulled and moved backward toward the vent hole.

FIG. 17 is a sectional view of section I-I of FIG. 16.

DESCRIPTION OF THE PREFERRED EMBODIMENTS

Figure 1:
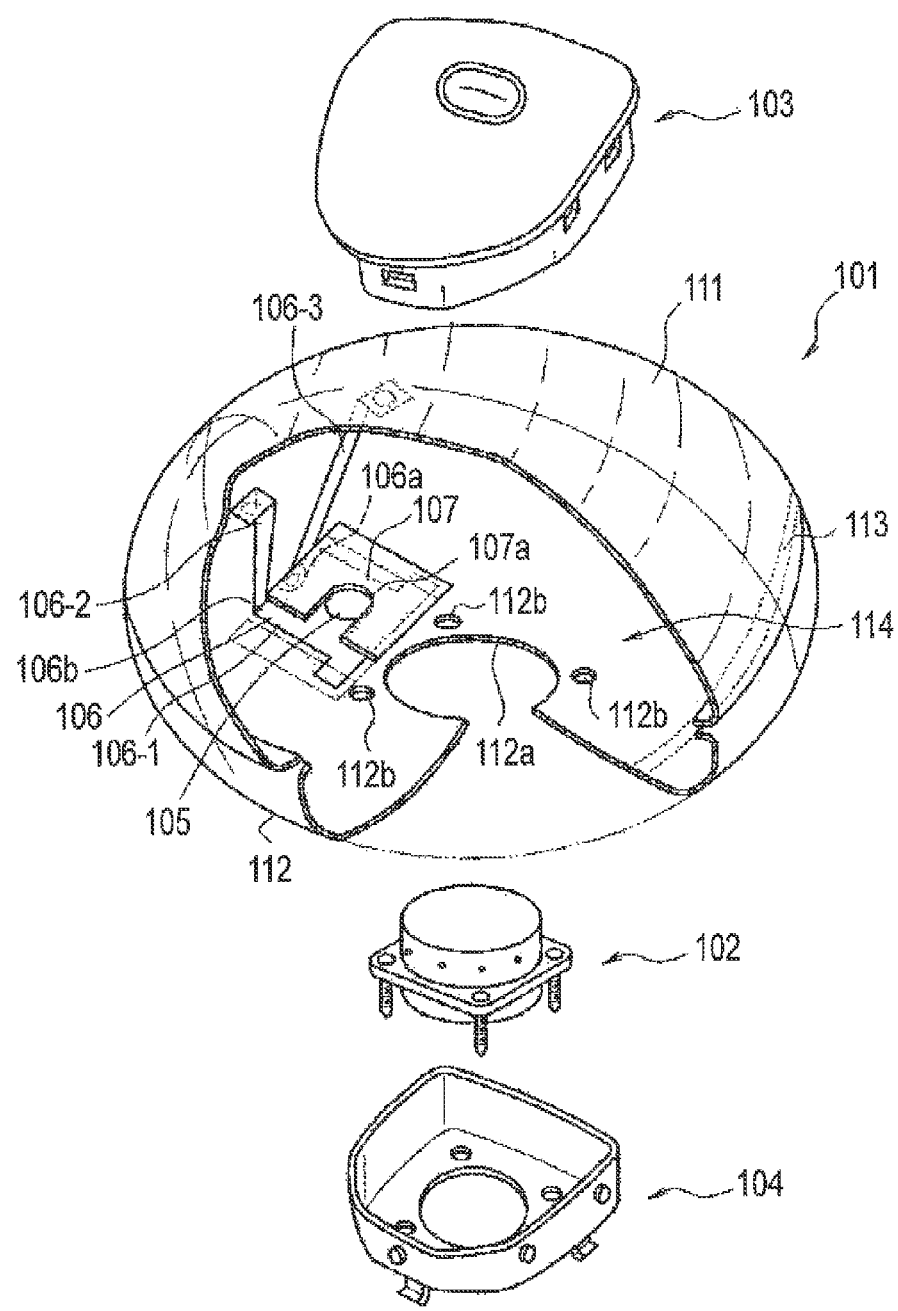
FIG. 1 is a partly broken schematic perspective view illustrating an airbag according to an embodiment of the present invention in a state of full deployment together with an inflator, an airbag cover and a back plate in an exploded state.

Next, a description will be given in detail of modes for carrying out the present invention with reference to the accompanying drawings. In the drawings, the same reference numerals are attached to the same portions or the corresponding portions, and an overlapping description will be appropriately simplified or omitted. The present invention is in short configured such that in an airbag having a configuration in which a vent hole for discharging the inflating gas within an airbag changes to three states of "open", "close" and "open", a slide tether provided for opening and closing the vent hole changes to the above three states by being pulled by a force acting in a deploying direction and a force acting in a direction intersecting with the deploying direction, in a deployment motion of the airbag.

Figure 2:
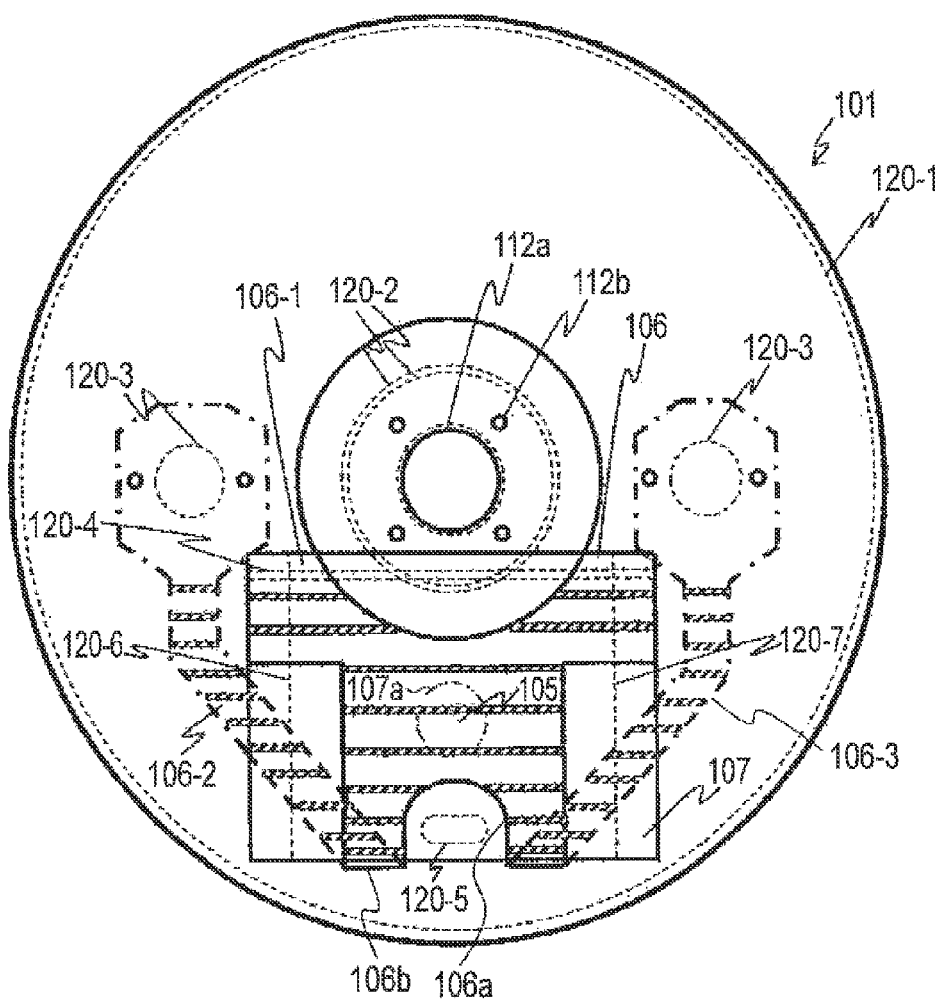
FIG. 2 is a plan view of the airbag shown in FIG. 1.
Figure 3:
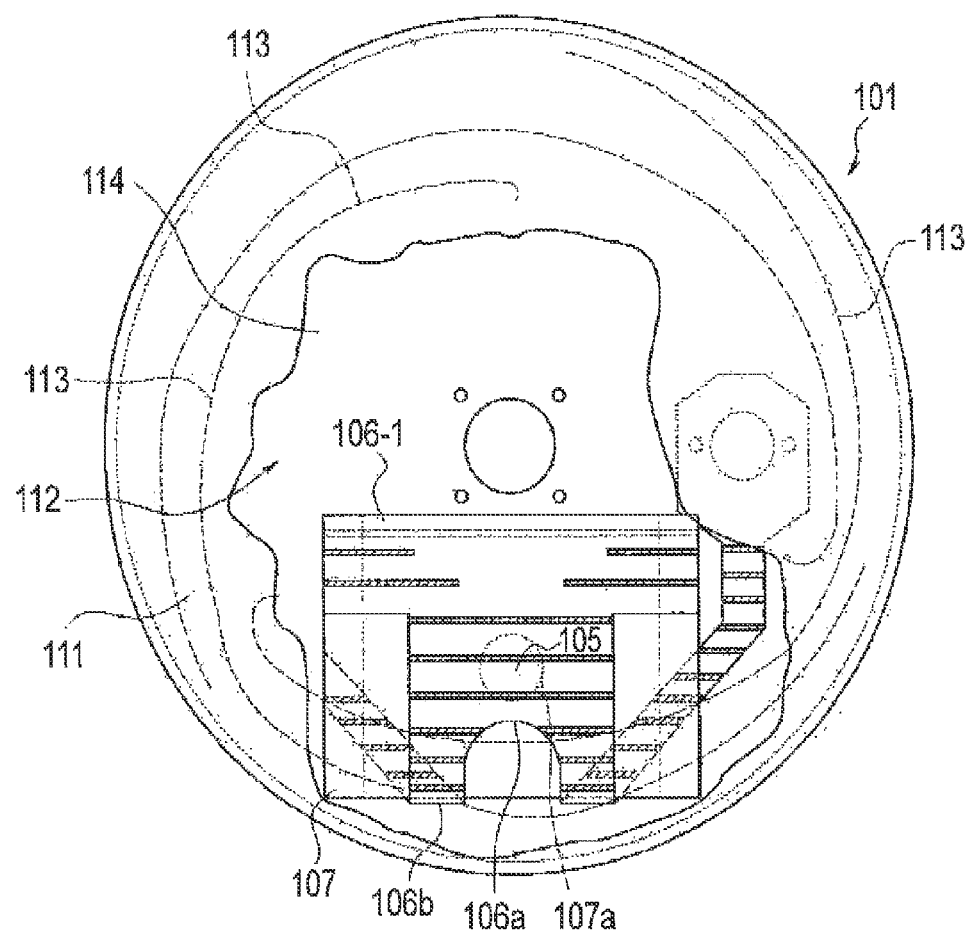
FIG. 3 is a partly broken schematic plan view illustrating the airbag shown in FIG. 1 in a partly broken state.

First, there will be given a detailed description of a structure of an airbag according to an embodiment of the present invention with reference to FIGS. 1 to 3. FIG. 1 is a partly broken schematic perspective view illustrating an airbag according to the embodiment of the present invention in a state of deployment together with an inflator, an airbag cover and a back plate in an exploded state, and FIG. 2 is a plan view of the airbag shown in FIG. 1. Furthermore, FIG. 3 is a partly broken schematic plan view illustrating the airbag shown in FIG. 1 in a partly broken state.

Figure 4:
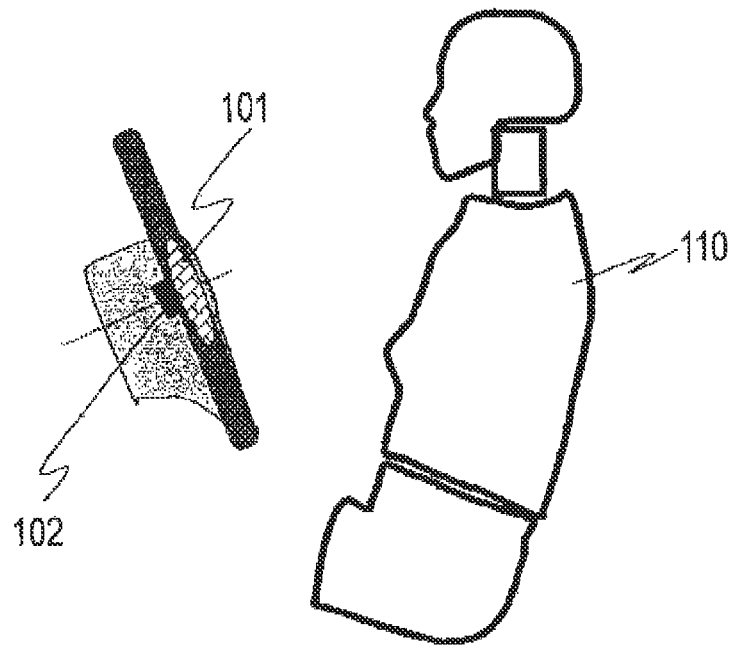
FIG. 4 is a view showing an initial state of the airbag device according to the embodiment of the present invention, in the case where an occupant is normally seated.

In FIG. 1, an airbag 101 according to the embodiment of the present invention is constituted so as to be deployed by inflating gas which is jetted out of an inflator 102 in the case where an impact such as a collision is applied to a vehicle not shown and to thereby capture and protect an occupant 110 (FIG. 4). Therefore, the airbag is constructed by joining a first face-constituting base fabric 111 which faces the occupant 110 side, and a second face-constituting base fabric 112 which faces a side opposite to the occupant in their respective outer peripheral positions by a sewing portion 120-1 (FIG. 2) according to, for example, an adhesive bonding or a lock stitch for forming a bag shape.

Furthermore, at the normal time of a vehicle not shown, the airbag device is installed in a vehicle body side, for example, a steering wheel not shown, in a state in which the airbag is accommodated in an accommodating chamber formed by an airbag case 103 and a back plate 104, under a state of being folded to an appropriate shape. An inflator 102 is attached to the second face-constituting base fabric 112 by bolts or the like not shown while utilizing a plurality of inflator mounting holes 112b, in which the inflator 102 is inserted into an inflator insertion hole (hereinafter, refer also to as "inflator mounting position") pierced in approximately the center portion of the second face-constituting base fabric 112, and the inflator mounting holes 112b are formed so as to surround the inflator insertion hole 112a.

Moreover, a vent hole 105 is formed in the second face-constituting base fabric 112, near an outer periphery of the inflator insertion hole 112a. The vent hole 105 is constituted so as to be opened and closed by a slide tether 106.

The slide tether 106 includes a slide tether body portion 106-1 which closes the vent hole 105, a slide tether bifurcated portion 106b which is formed so as to be bifurcated from the slide tether body portion 106-1, and slide tether leg piece portions 106-2 and 106-3. The upper end portion, in a longitudinal direction, of the slide tether body portion 106-1 is sewed, by a sewing portion 120-4, with an inner surface of the second face-constituting base fabric 112 together with one end portion of a slide tether cover 107 mentioned later. Furthermore, a slide tether-protruding portion formed in a root portion of the slide tether 106 mentioned later is sewed, by sewing portions 120-6 and 120-7, with the inner surface of the second face-constituting base fabric 112. Meanwhile, FIG. 2 shows an example in which the sewing portion 120-4 and a sewing portion 120-2 of a cover covering a periphery of the inflator 102 overlap, but of course these sewing portions may be arranged so as not to overlap with each other. The motion, in relation to a deploying direction of the airbag 101, of the slide tether bifurcated portion 106b is regulated by substantially the center portion of the other end portion of the slide tether cover 107 being sewed, by a sewing portion 120-5, with the inner surface of the second face-constituting base fabric 112. Each of extended leading end portions of the slide tether leg piece portions 106-2 and 106-3 is sewed, by a sewing portion 120-3, with the inner surface of the first face-constituting base fabric 111.

In addition, a communication portion 106a communicating with the vent hole 105 is formed in the slide tether bifurcated portion 106b corresponding to a position at which the slide tether body portion 106-1 and the slide tether leg piece portions 106-2 and 106-3 are branched. Furthermore, FIG. 2 shows the example in which the sewing portion 120-4 is provided between the inflator mounting position 112a and the vent hole 105, but the sewing portion 120-4 can be provided at an optional position in a direction going from the vent hole 105 toward the inflator mounting position 112a, as long as the sewing portion is not an obstacle to an deployment performance of the airbag. That is, the sewing portion 120-4 can also be provided at a position beyond the inflator mounting position 112a (in a direction opposite to the direction from the inflator mounting position 112a toward the vent hole 105).

And, as shown in FIG. 3, joints 113 capable of being separated by a predetermined inflating gas pressure are formed in the first face-constituting base fabric 111 and the second face-constituting base fabric 112, both in an outer peripheral side of the vent hole 105. The joints 113 demarcate and form a small bag portion 114 in an inner peripheral side including the vent hole 105, for example, by performing sewing spirally from the outer peripheral portion of the airbag 1 toward the center portion so that their respective terminal portions face.

Furthermore, the slide tether 106 is covered with the slide tether cover 107 in a state in which the slide tether 106 strides over the slide tether body portion 106-1, the slide tether bifurcated portion 106b, and the slide tether leg piece portions 106-2 and 106-3. The slide tether cover 107 is sewed with the inner surface of the second face-constituting base fabric 112 via the slide tether body portion 106-1 and the slide tether bifurcated portion 106b by the sewing portions 120-4 and 120-5, and is sewed with the inner surface of the second face-constituting base fabric 112 via a slide tether-protruding portion formed in a root portion of the slide tether 106 mentioned later by sewing portions 120-6 and 120-7. Furthermore, a communication hole 107a (an opening) communicating with the vent hole 105 via the communication portion 106a is formed in the slide tether cover 107.

In the airbag 101 according to the present invention having the configuration mentioned above, in the case where an impact is applied by the encounter with a collision accident or the like of the vehicle not shown, an airbag controller not shown senses the impact, gives instructions to the inflator 102 to thereby supply the inflating gas into the airbag 101, and inflates and deploys the airbag 101.

Meanwhile, a folding method for accommodating the airbag 101 in the accommodating chamber formed by the airbag case 103 and the back plate 104 may employ any of a manually folding and a folding by machine as long as the airbag is folded from the outer side toward the center and is easily deployed in the deploying direction in the deployment motion and in the direction intersecting with the deploying direction, in the same manner as the conventional airbag.

Next, there will be given a description of a series of motions of the airbag according to the embodiment of the present invention, in the case where the vehicle encounters the collision accident from a state in which the occupant is normally seated in a normal position. FIG. 4 is a view showing an initial state of the airbag according to the embodiment of the present invention, in the case where the occupant is normally seated, and FIG. 5 is an explanatory view illustrating the state of deployment of the airbag according to the embodiment of the present invention, and is a view showing an initial state of deployment of the airbag in the case where the occupant is near the airbag.

Figure 5:
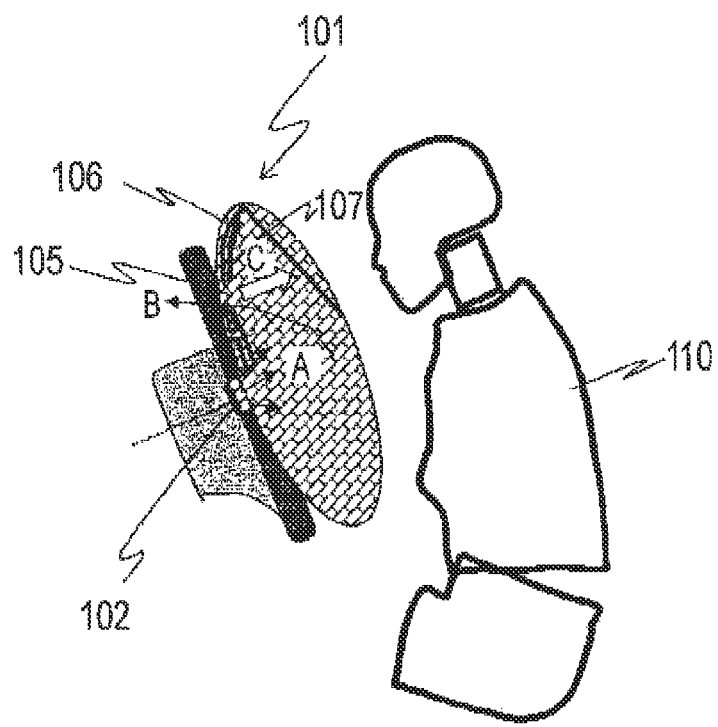
FIG. 5 is an explanatory view illustrating a state of deployment of the airbag according to the embodiment of the present invention, and is a view showing an initial state of deployment of the airbag in the case where the occupant is near the airbag.
Figure 6:
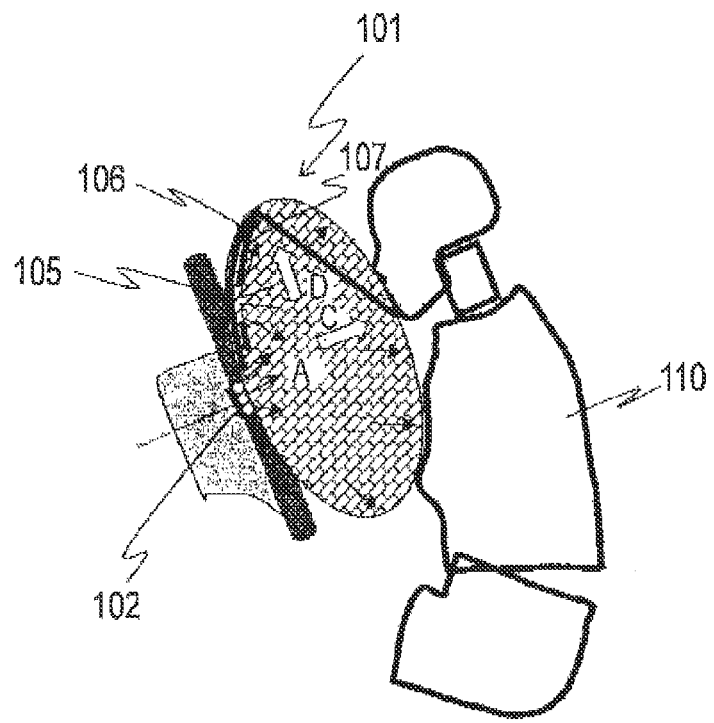
FIG. 6 is an explanatory view illustrating the state of deployment of the airbag according to the embodiment of the present invention, and is a view showing a full deployment state in which the airbag reaches the occupant by progress of the deployment of the airbag from the state in FIG. 5.
Figure 7:
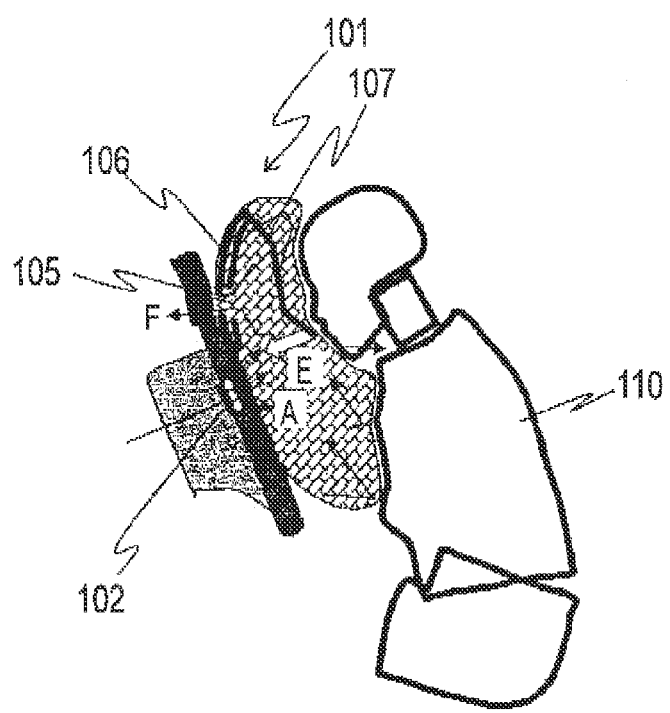
FIG. 7 is an explanatory view illustrating the state of deployment of the airbag according to the embodiment of the present invention, and is a view showing a state in which the airbag captures and protects the occupant by discharging a part of inflating gas to the outside in the case where the occupant comes into contact with the airbag, in the full deployment state of the airbag shown in FIG. 6.

FIG. 6 is an explanatory view illustrating the state of deployment of the airbag according to the embodiment of the present invention, and is a view showing a full deployment state in which the airbag reaches the occupant by progress of the deployment of the airbag from the state in FIG. 5, and FIG. 7 is an explanatory view illustrating the state of deployment of the airbag according to the embodiment of the present invention, and is a view showing a state in which the airbag captures and protects the occupant by discharging a part of the inflating gas to the outside in the case where the occupant comes into contact with the airbag, in the full deployment state of the airbag shown in FIG. 6.

Figure 8B:
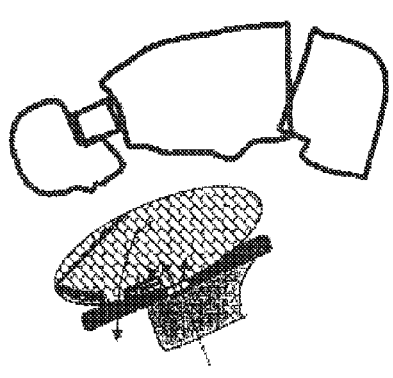
FIG. 8B is an explanatory view illustrating the state of deployment of the airbag according to the embodiment of the present invention, and is a view showing an initial state of deployment of the airbag in the case where the occupant is near the airbag.
Figure 8D:
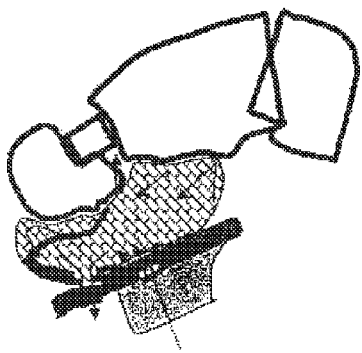
FIG. 8D is an explanatory view illustrating the state of deployment of the airbag according to the embodiment of the present invention, and is a view showing a state in which the airbag captures and protects the occupant by discharging a part of the inflating gas in the case where the occupant comes into contact with the airbag.
Figure 8A:
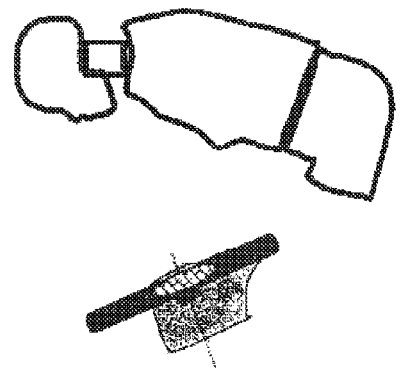
FIG. 8A is an explanatory view illustrating the state of deployment of the airbag according to the embodiment of the present invention, and is a view showing an initial state in the case where the occupant is normally seated.
Figure 8C:
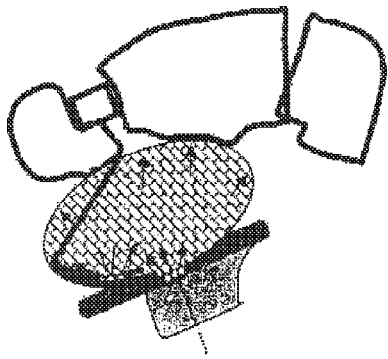
FIG. 8C is an explanatory view illustrating the state of deployment of the airbag according to the embodiment of the present invention, and is a view showing a full deployment state in which the airbag reaches the occupant by progress of the deployment of the airbag.

FIGS. 8A, BB, 8C and 8D are explanatory views illustrating the state of deployment of the airbag according to the embodiment of the present invention, in which FIG. 8A is a view showing an initial deflated state where the occupant is normally seated, FIG. 8B is a view showing an initial state of deployment of the airbag in the case where the occupant is near the airbag, FIG. 8C is a view showing a full deployment state in which the airbag reaches the occupant by progress of the deployment of the airbag, and FIG. 8D is a view showing a state in which the airbag captures and protects the occupant by discharging a part of the inflating gas in the case where the occupant comes into contact with the airbag. The state of deployment of the airbag transitions as shown in FIGS. 8A, 8B, 8C and 8D.

Figure 9A:
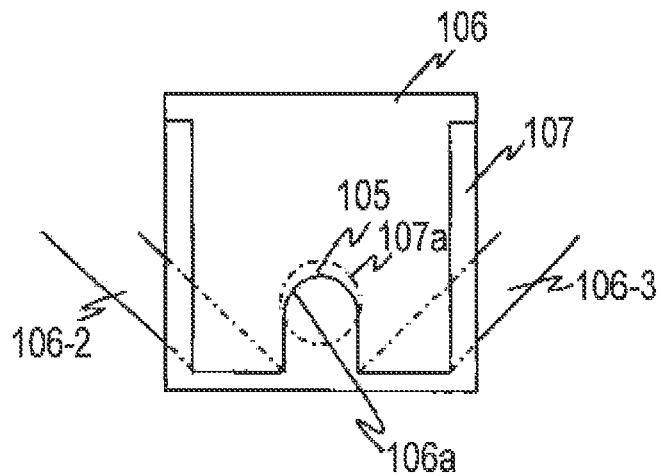
FIG. 9A is a view explaining a position of a vent hole and a slide tether in the state of deployment of the airbag according to the present invention, and is a view showing the initial state of deployment of the airbag in the case where the occupant is near the airbag.
Figure 9B:
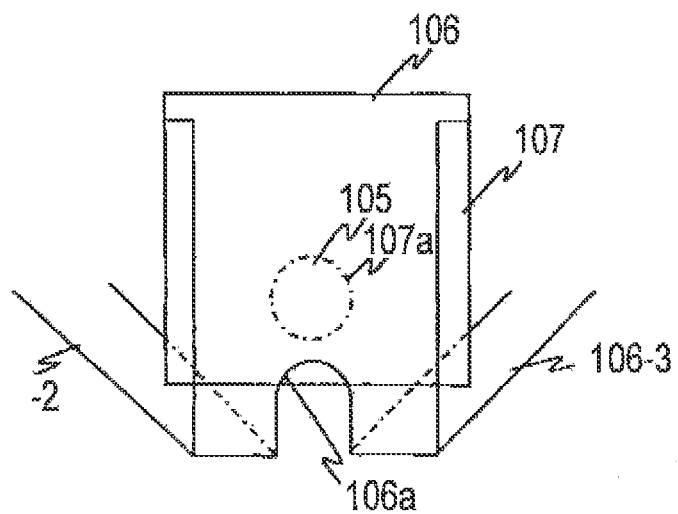
FIG. 9B is a view explaining the position of the vent hole and the slide tether in the state of deployment of the airbag according to the present invention, and is a view showing the full deployment state in which the airbag reaches the occupant by progress of the deployment of the airbag.
Figure 9C:
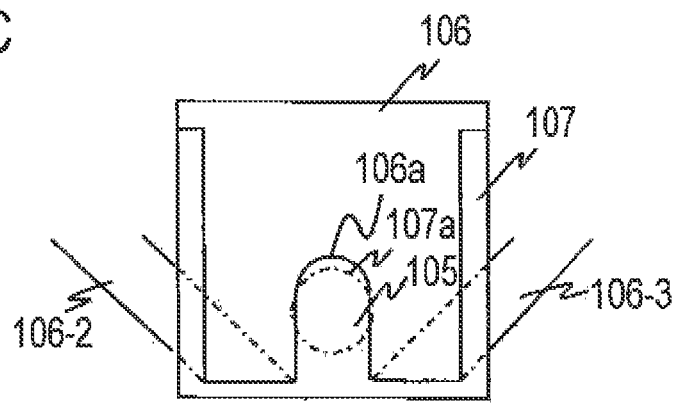
FIG. 9C is a view explaining the position of the vent hole and the slide tether in the state of deployment of the airbag according to the present invention, and is a view showing the state in which the airbag captures and protects the occupant by discharging a part of the inflating gas to the outside in the case where the occupant comes into contact with the airbag.

FIGS. 9A, 9B and 9C are views explaining positions of the vent hole and the slide tether in the state of deployment of the airbag according to the present invention, in which FIG. 9A is a view showing the initial state of deployment of the airbag in the case where the occupant is near the airbag, FIG. 9B is a view showing the full deployment state in which the airbag reaches the occupant by progress of the deployment of the airbag, and FIG. 9C is a view showing the state in which the airbag captures and protects the occupant by discharging a part of the inflating gas to the outside in the case where the occupant comes into contact with the airbag.

First, in the case where the occupant 110 is seated in a normal position as shown in FIG. 4, the inflator 102 is attached to the airbag 101 according to the embodiment of the present invention, and the airbag 101 is installed to the vehicle body side such as the steering wheel of the vehicle not shown. Meanwhile, in FIGS. 4 to 7, it is assumed that a left-hand direction is a forward direction of the vehicle, and a right-hand direction is a rearward direction of the vehicle. In this state, a relationship between the airbag 101 according to the embodiment of the present invention and the occupant 110 is the state as can be seen in FIG. 8A, and the airbag 101 is positioned in front of the occupant 110.

Next, in the case where the vehicle encounters with a collision accident or the like, the airbag controller not shown senses the impact, triggers the inflator 102 to thereby supply the inflating gas into the airbag 101, and inflates and deploys the airbag 101. In addition, when the occupant 110 starts to comparatively come close to the airbag 101 as shown in FIG. 5, the first face-constituting base fabric 111 and the second face-constituting base fabric 112 are joined to each other in their outer peripheral portions by the joints 113 (FIG. 3) which can be separated by the predetermined inflating gas pressure, as the deployment initial stage. Additionally, the inflating gas supplied from the inflator 102 is discharged in a direction A in FIG. 5, and the airbag 101 starts to deploy in a direction C in FIG. 5 as the deployment motion.

At this time, the slide tether leg piece portions 106-2 and 106-3 sewed within the first face-constituting base fabric 111 side pull the slide tether 106, and thus the slide tether body portion 106-1 in a slacken state moves a little on the slide tether cover 107 sewed with the second face-constituting base fabric 112 by the sewing portion 120-5. Accordingly, by the communication between the communication hole 107a of the slide tether cover 107 and the communication portion 106a of the slide tether 106, the vent hole 105 is put into an open state without being closed. This state is shown in FIG. 9A.

As mentioned above, an opening portion is formed by the communication between the communication portion 106a of the slide tether 106 and the communication hole 107a of the slide tether cover 107. In addition, the inflating gas supplied from the inflator 102 is discharged out of the opening portion in a direction B in FIG. 5. This is the first "open" state among three states mentioned above. At this time, the relationship between the airbag 101 according to the embodiment of the present invention and the occupant 110 is put into a state shown in FIG. 8B.

As a result, the airbag 101 is deployed in an early stage under a small volume achieved by the small bag portion 114 (FIG. 3). Additionally, in this state, the inflating gas is discharged to the outside from the vent hole 105, via the communication portion 106a of the slide tether and the communication hole 107a of the slide tether cover, and the approaching occupant 110 is reliably and softly captured and protected by an appropriate deflation of the airbag 101 even if the occupant 110 comes into contact with the airbag 101.

Next, with the passage of time from a state shown in FIG. 5, an amount of the inflating gas discharged from the inflator 102 in the direction A in FIG. 5 is further increased, and thus the airbag 101 is further inflated, and is shifted into a state as shown in FIG. 6. At this time, the airbag 101 starts to deploy in the direction C in FIG. 6 as a deployment motion, and also start to inflate in a direction D, that is, the direction D intersecting with the direction C corresponding to the deploying direction.

The slide tether leg piece portions 106-2 and 106-3 sewed with the first face-constituting base fabric 111 side further pull the slide tether 106, and thus the slide tether body portion 106-1 further moves on the slide tether cover 107, and the slide tether 106 reaches an extended state. As a result, the communication hole 107a of the slide tether cover 107 and the communication portion 106a of the slide tether 106 are misaligned with each other, the communication portion 106a of the slide tether 106 is not communicated with the communication hole 107a of the slide tether cover 107, and the vent hole 105 and the communication hole 107a of the slide tether cover 107 are both closed. This state is shown in FIG. 9B. Meanwhile, a closed state of the vent hole 105 by the slide tether 106 is set to a completely closed state in FIGS. 6 and 9B, but is not limited to such completely closed state, and in other case it may be set to a small opening state.

Furthermore, the inflating gas supplied from the inflator 102 is not discharged to the outside of the airbag 101, but stays within the airbag 101. This is the next "close" state among three states mentioned above. At this time, the relationship between the airbag 101 according to the embodiment of the present invention and the occupant 110 is put into a state as shown in FIG. 8C.

Meanwhile, the state of deployment shown in FIG. 6 is a state which may occur even in the case where the occupant 110 is seated in a state of being far from the airbag 101, at the time of the encounter with the collision accident or the like of the vehicle, and the airbag 101 makes progress from the initial state of deployment and is changed to the state of full deployment. In the process of progress, in the case where the gas pressure of the inflating gas within the airbag 101 is increased to a predetermined pressure or higher, the sewing constituting the joint 113 (FIG. 3) is separated. As a result, the airbag 101 is changed to the state of full deployment.

As a result, the airbag 101 is formed into a deployed shape having a large volume by separating the joint 113, and in the process of progress, transitions in early stages to the state of full deployment and early and reliably captures the occupant 110 having been spaced therefrom, by closing the vent hole 105 or making the vent hole 105 small in the opening through the pulling motion of the slide tether 106.

Further, in the case where the occupant 110 comes into contact with the airbag 101 as shown in FIG. 7 in the state of full deployment shown in FIG. 6, the airbag 101 is pressed by the body of the occupant 110. As a result, the inflating gas filled in the airbag 101 moves, and thus the airbag 101 is depressed in a direction E, and the slide tether 106 sewed with the first face-constituting base fabric 111 deflects while being guided by the slide tether cover 107, and is slackened.

In addition, since the body portion 106-1 of the slide tether 106 is sewed with the second face-constituting base fabric 112 together with the slide tether cover 107 by the sewing portion 120-5, a surplus length of the slide tether 106 reaching the slackened state jumps out of the vent hole 105, whereby the opening is formed between the inside and the outside of the airbag 101. This state is shown in FIG. 9C.

Accordingly, the inflating gas is discharged in a direction F in FIG. 7, and the airbag 101 is depressed along the lines of the shape of the head portion of the occupant 110 as shown in FIG. 8D, and softly protects the occupant 110 having been spaced therefrom.

Figure 10:
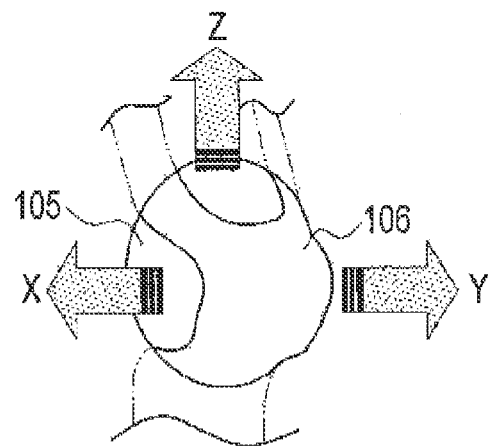
FIG. 10 is a view explaining a state in which the inflating gas is discharged to the outside when the occupant comes into contact with the airbag after the deployment of the airbag, in the airbag device according to the embodiment of the present invention.

Here, there will be given a detailed description of a state in which the inflating gas filled in the airbag 101 is discharged to the outside in the case where the occupant 110 comes into contact with the airbag 101. FIG. 10 is a view explaining a state in which the inflating gas is discharged to the outside at the time of contact with the occupant after the deployment of the airbag, in the airbag according to the embodiment of the present invention. As shown in FIG. 10, the surplus length of the slide tether 106 put into a slackened state jumps out of the vent hole 105, and thus the inflating gas filled in the airbag 101 is discharged to the outside toward three directions including the directions X, Y and Z.

Figure 11:
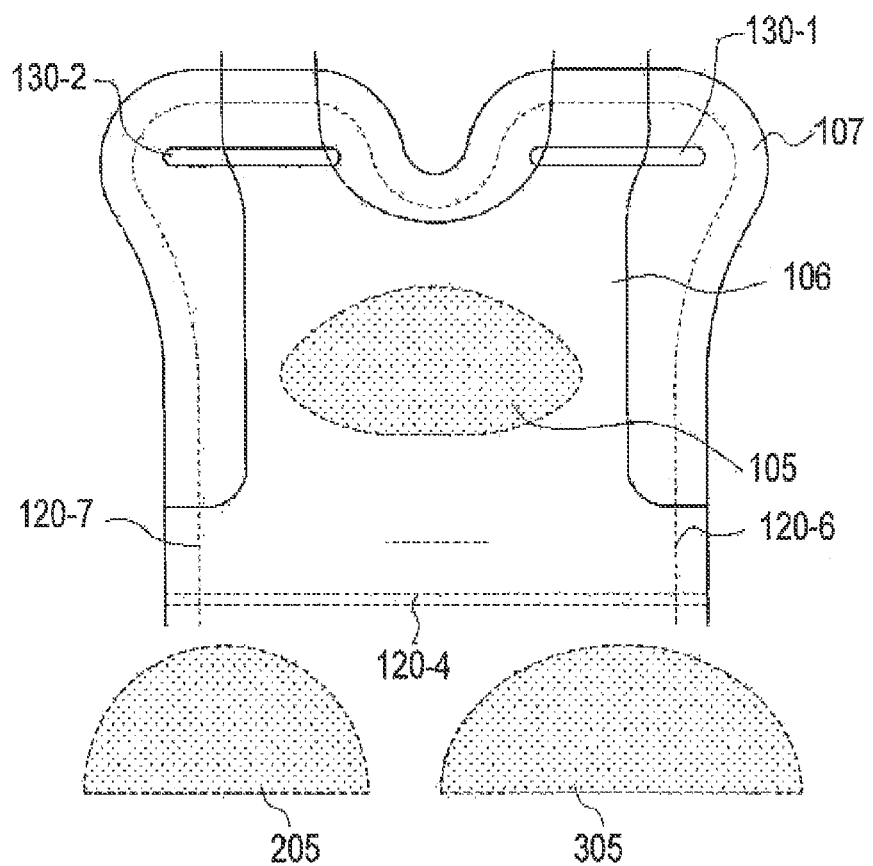
FIG. 11 is a view explaining a shape of the vent hole of the airbag according to the embodiment of the present invention.

In addition, in order to efficiently carry out exhaust toward three directions as shown in FIG. 10, it is more preferable to form the shape of the vent hole 105 into a longer shape in the direction X-Y. There will be given a description of this point referring to FIG. 11. FIG. 11 is a view explaining the shape of the vent hole of the airbag according to the embodiment of the present invention. As shown in FIG. 11, an exhaust efficiency of the inflating gas filled in the airbag 101 can be more enhanced by forming the shape of the vent hole into a semicircular shape such as a vent hole 205 or into a half oval shape such as a vent hole 305, in place of forming the shape of the vent hole 105 into a circular shape.

As described above, the conventional airbag carries out the opening and closing motion of the vent hole on the basis of the force generated by the deployment in the deploying direction (a front-back direction of the vehicle), whereas in the embodiment according to the present invention, the airbag carries out the opening and closing motion of the vent hole on the basis of the force generated by the deployment in the deploying direction (the front-back direction of the vehicle), and the force generated by the deployment in the direction intersecting with the deploying direction.

In other words, the slide tether which has been pulled in the deploying direction of the airbag (the front-back direction of the vehicle) is also pulled in the direction intersecting with the deploying direction, in addition to the deploying direction of the airbag (the front-back direction of the vehicle).

In short, conventionally, the supporting points of the slide tether have been provided at two positions in the first face-constituting base fabric and the second face-constituting base fabric, and three states "open", "close" and "open" have been conventionally carried out with the deploying direction of the airbag as a starting point. Whereas, in the embodiment according to the present invention, the supporting points of the slide tether are provided at three positions, the first supporting point, the second supporting point and the third supporting point. The first supporting point is in the portion at which the upper end portion in the longitudinal direction of the slide tether body portion is joined to the inner surface of the second face-constituting base fabric in the direction going from the vent hole toward the inflator mounting position. The second supporting point is in the portion at which substantially the center portion of the other end portion of the slide tether cover is joined to the inner surface of the second face-constituting base fabric and there is regulated the motion of the slide tether bifurcated portion with respect to the deploying direction of the airbag. And the third supporting point is in the portion at which the slide tether leg piece portions are joined to the inner surface of the first face-constituting base fabric. And three states "open", "close" and "open" are carried out on the basis of the force acting in the airbag deploying direction which is generated with the first supporting point and the third supporting point as starting points, and the force acting in the direction intersecting with the airbag deploying direction which is generated with the second supporting point as a starting point. As a result, the deploying direction of the airbag and the direction in which the vent hole is closed are the same, and it is possible to pull the slide tether quicker.

Furthermore, in the embodiment according to the present invention, the communication portion of the slide tether overlaps with the vent hole which is at the position closer to the sewing portion to which the slide tether cover is fixed, by making the position of the vent hole closer to the inflator insertion hole (the center of the airbag). Thus it is possible to exhaust the inflating gas in a more stable "open" state. As a result, there is no need to make the inflator (its capability to generate the inflating gas amounts) unnecessarily large.

Figure 12:
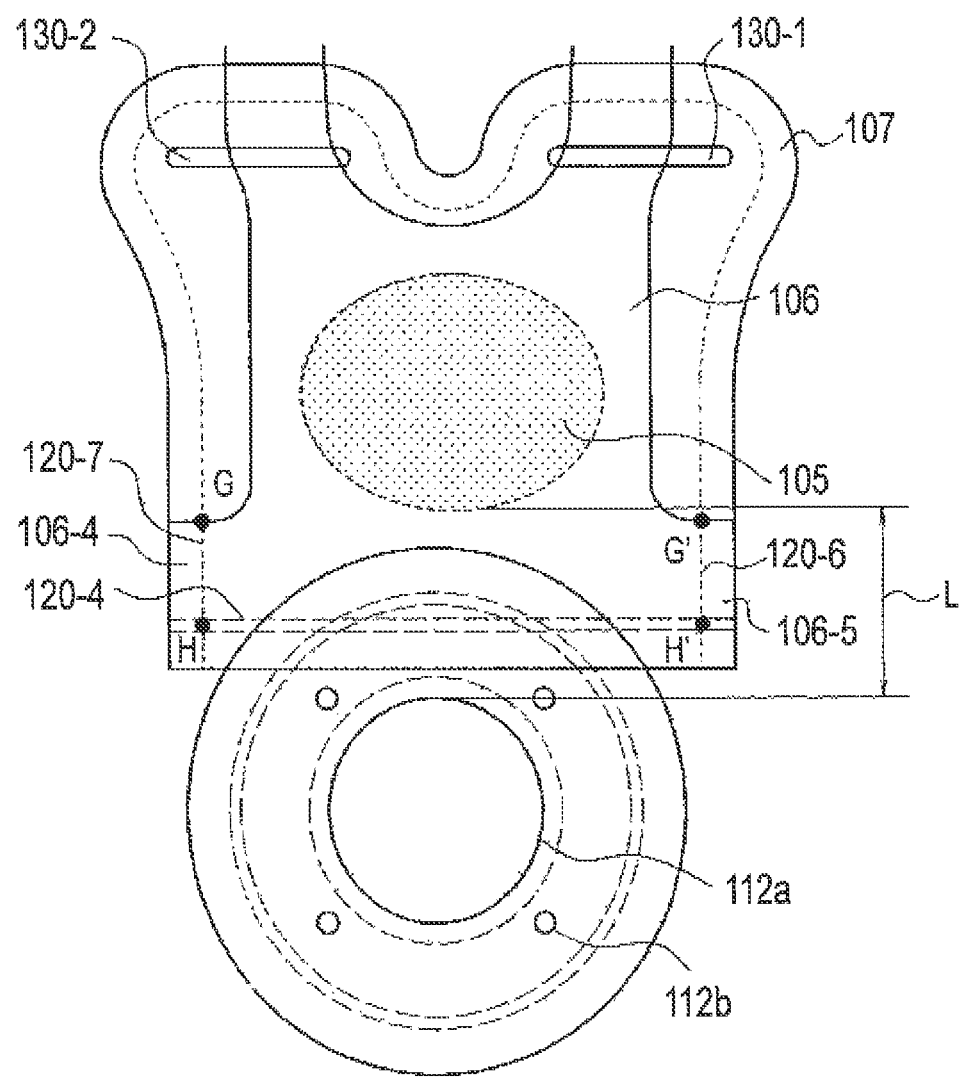
FIG. 12 is a view explaining a dimension from an inflator insertion hole to a position of the vent hole, and a sewing of a root portion of the slide tether, in the airbag according to the embodiment of the present invention.

Here, there will be explained a description of a dimension from the inflator insertion hole to the position of the vent hole, and of the sewing of the root portion of the slide tether. FIG. 12 is a view explaining the dimension from the inflator insertion hole to the position of the vent hole, and the sewing of the root portion of the slide tether, in the airbag according to the embodiment of the present invention. As shown in FIG. 12, in the case where a dimension L from the inflator insertion hole 112a to the position of the vent hole 105 is set to a numerical value between 10 mm and 50 mm, the slide tether 106 becomes easier to closely adhere to the second face-constituting base fabric 112 of the airbag 101 in the "close" state, and more air tightness is achieved.

That is, in the "close" state, the supporting point pulling the slide tether 106 is preferably closer to the vent hole 105 to the extent that the vent hole 105 is closed, and one of the supporting points of the slide tether 106 is provided in the second face-constituting base fabric 112 which is the position closer to the vent hole 105 to the extent that the vent hole 105 is reliably closed. A suitable diameter of the vent hole 105 is different depending on a type of motor vehicle and impact force, and has an adjustment margin and a tuning margin according to a type of motor vehicle and impact force.

Furthermore, an angle at which the slide tether leg piece portions 106-2 and 106-3 are pulled in relation to the slide tether body portion 106-1 is set to an angle at which a distance pulling the slide tether leg piece portions 106-2 and 106-3 is the shortest distance. Furthermore, by bifurcating the slide tether leg piece portions 106-2 and 106-3, the slide tether 106 is not pulled by one point at the time of being pulled, and it is possible to stably deploy on the surface without causing any wrinkles on the slide tether body portion 106-1. That is, since the slide tether leg piece portions 106-2 and 106-3 are provided so as to be mutually directed toward outside around the sewing portion of the slide tether body portion 106-1, it is possible to stably expand, as a surface, the vent hole 105 closed by the slide tether cover 107 and the slide tether 106.

Furthermore, the slide tether 106 is formed into a shape having root portions partly protruded in a direction opposite to each other, as shown in FIG. 12, and is configured such that slide tether protruding portions 106-4 and 106-5 formed in the root portions of the slide tether 106 are sewed respectively by sewing portions 120-7 and 120-6, and the inflator insertion hole 112a side is sewed by a sewing portion 120-4.

That is, as is seen in FIG. 12, the root portion in the pulling direction of the slide tether 106 is firmly fixed by a substantially U-shaped sewing which is formed by a lower end portion sewing line H-H' in the pulling direction of the slide tether 106, and by protruding portion sewing lines G-H and G'-H' respectively in a direction orthogonal to the lower end portion line H-H'. Accordingly, even when the slide tether 106 is pulled by the deployment force of the airbag 101, the deployment behavior of the airbag 101 tends to be easily stabilized.

The slide tether protruding portions 106-4 and 106-5 are sewed by the sewing portions 120-7, 120-4 and 120-6, and thus the root portion is firmly fixed even if the pulling direction of the slide tether 106 moves violently in a lateral direction at the time of the deployment of the airbag 101. Therefore, it becomes possible to reliably cover the vent hole 105.

Figure 13:
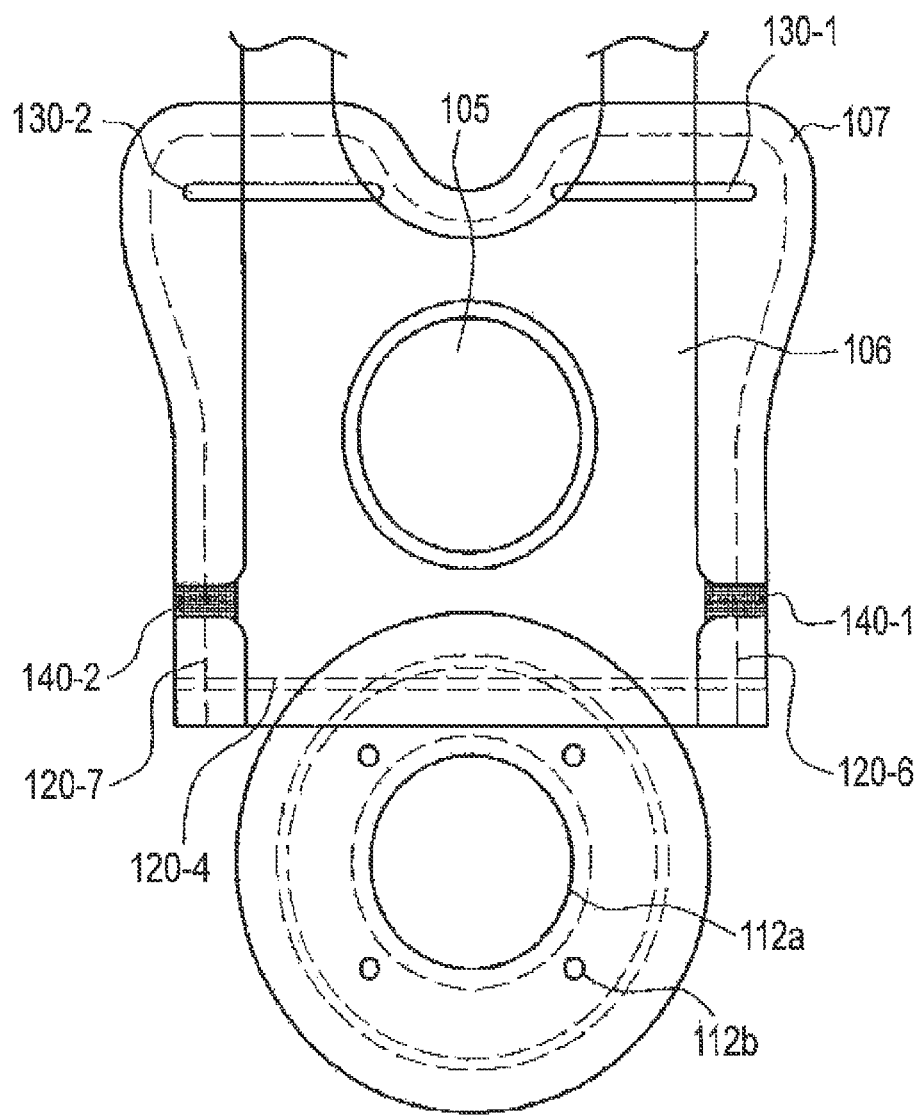
FIG. 13 is a view explaining an example of the sewing of a protruding portion of the slide tether, in the airbag device according to the embodiment of the present invention.

Next, there will be given a description of the shape of the sewing of the slide tether protruding portions 106-4 and 106-5. FIG. 13 is a view explaining an example of the sewing of the protruding portion of the slide tether, in the airbag according to the embodiment of the present invention, and FIG. 14 is a view explaining the other example of the sewing of the protruding portion of the slide tether, in the airbag according to the embodiment of the present invention.

Figure 14:
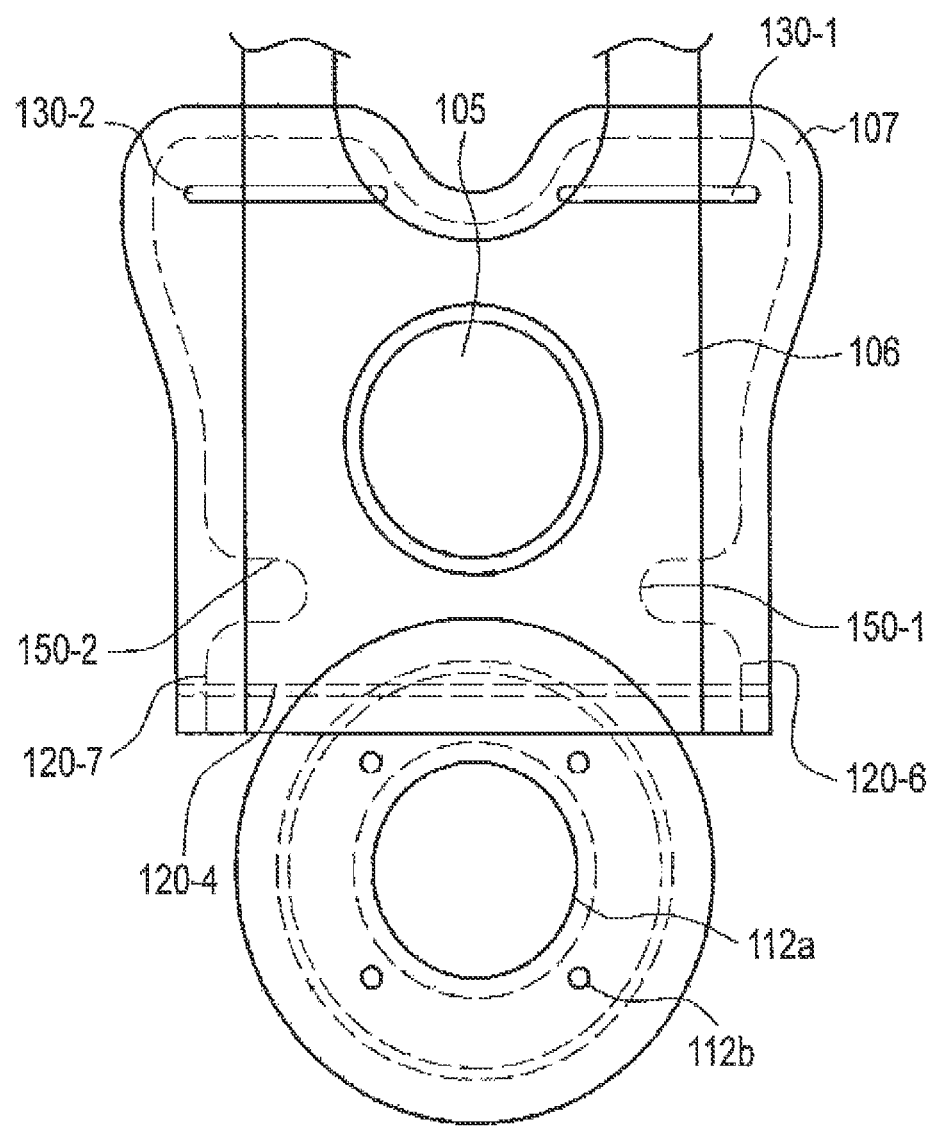
FIG. 14 is a view explaining the other example of the sewing of the protruding portion of the slide tether, in the airbag device according to the embodiment of the present invention.
Figure 18:
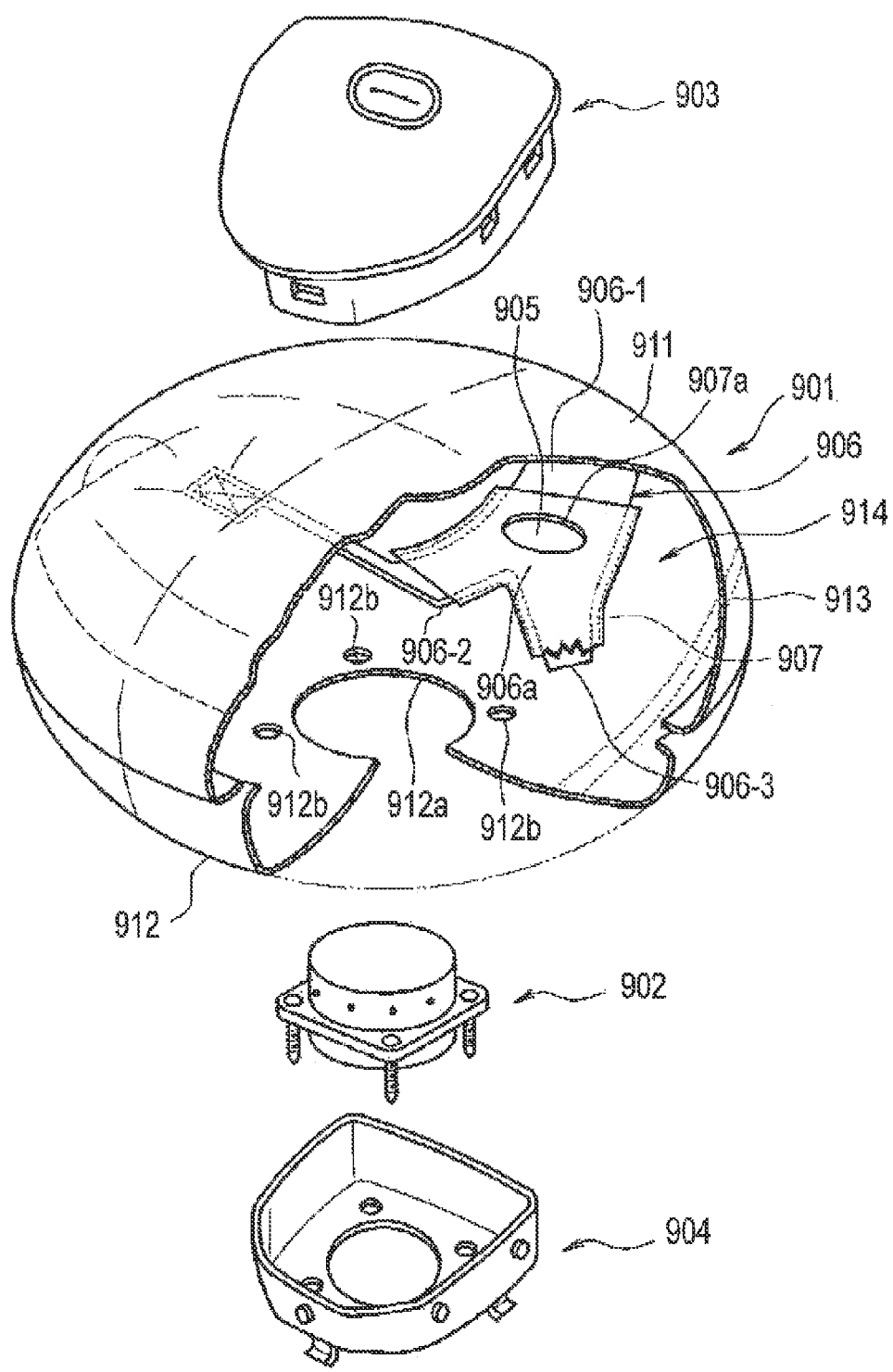
FIG. 18 is a partly broken schematic perspective view illustrating a conventional airbag in a state of deployment together with an inflator, an airbag cover and a back plate in an exploded state.
Figure 19:
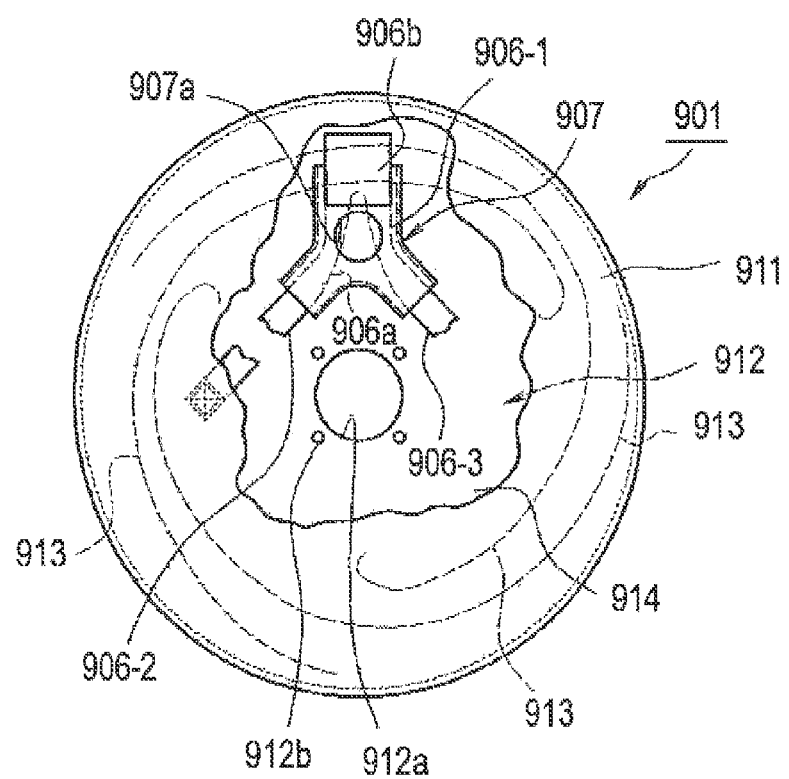
FIG. 19 is a plan view illustrating the airbag shown in FIG. 18 in a partly broken state.
Figure 20A:
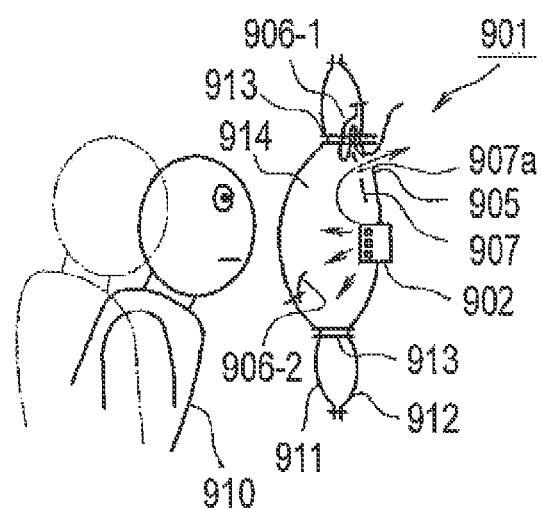
FIG. 20A is an explanatory view illustrating the state of deployment of the conventional airbag, and is a view showing an initial state of deployment of the airbag in the case where an occupant is near the airbag.
Figure 20B:
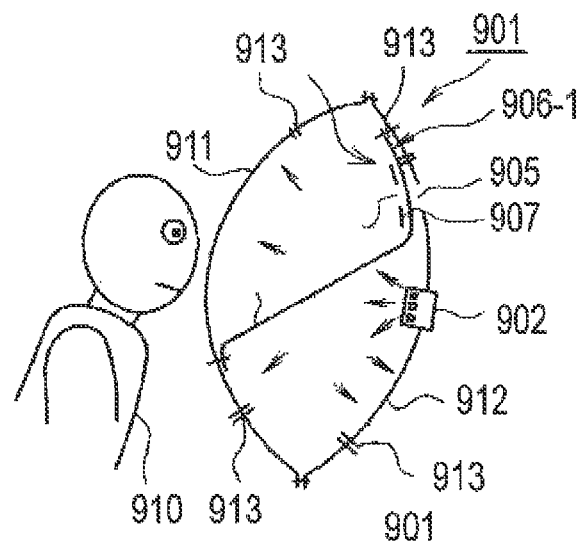
FIG. 20B is an explanatory view illustrating the state of deployment of the conventional airbag, and is a view showing a full deployment state reaching from the state in FIG. 20A by progress of the deployment of the airbag in the case where the occupant is away from the airbag.
Figure 20C:
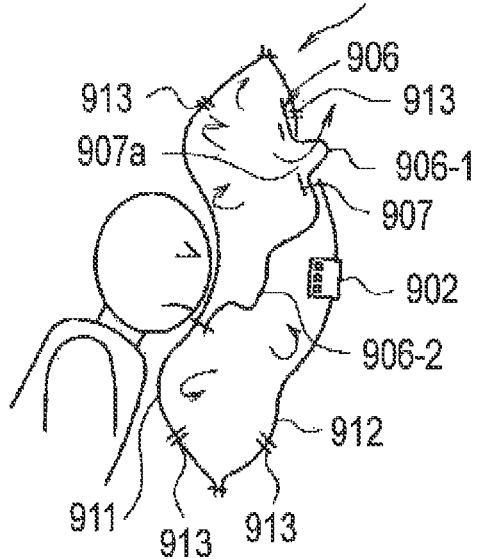
FIG. 20C is an explanatory view illustrating the state of deployment of the conventional airbag, and is a view showing a state in which the airbag captures and protects the occupant by discharging a part of the inflating gas to the outside in the case where the occupant comes into contact with the airbag, under the full deployment state of the airbag shown in FIG. 20B.

As shown in FIG. 13, in the case where the slide tether protruding portions 106-4 and 106-5 formed in a part of the slide tether 106 are sewed with the slide tether cover 107, and the second face-constituting base fabric 112 by partial sewing portions 140-1 and 140-2, or as shown in FIG. 14, in the case where the slide tether protruding portions 106-4 and 106-5 formed in a part of the slide tether 106 are sewed with the slide tether cover 107 and the second face-constituting base fabric 112 by inner sewing portions 150-1 and 150-2, the same effect as mentioned above can be obtained. Meanwhile, the sewing method shown here is an example, and any sewing method can be employed as long as the root portion in the protruding direction of the slide tether 106 is stably sewed.

Next, there will be given a description of a slot hole of the slide tether cover 107. FIGS. 11 to 14 are provided with slot holes 130-1 and 130-2 for passing the slide tether bifurcated portion 106b therethrough. By passing the slide tether bifurcated portion 106b through the slot holes 130-1 and 130-2 in place of passing a sewing presumptive portion in an outer peripheral edge portion of the slide tether cover 107 as a partial non-sewing through the slide tether bifurcated portion 106b, a load applied to the sewing portion of the slide tether cover 107 from the slide tether bifurcated portion 106b is easily dispersed at the time of the deployment motion of the airbag 101, and it is possible to reduce a cost for reinforcement or the like.

In FIGS. 11 to 14, the example of the long hole is shown as the shape of the slot holes 130-1 and 130-2, but the shape can be formed in various shapes. For example, a slit shape may be employed in place of the long hole, and a shape obtained by setting circles in both ends of the slit shape may be employed. Further, an oval hole may be employed in place of the long hole. Further, in FIGS. 11 to 14, the longitudinal direction of the long hole in the slot holes 130-1 and 130-2 is provided in parallel to the lower end portion sewing line H-H' in the pulling direction of the slide tether 106 shown in FIG. 12, but may be provided in a diagonal direction in relation to the lower end portion sewing line H-H'.

As shown in FIG. 5, a stopper piece 106-5 may be arranged on the slide tether leg piece portion 106-2, 106-3. Each of the stopper pieces 106-5 has turn-over portion 106-7 at the side near the vent hole 105, and is fixed on the face of the slide tether leg piece portions 106-2, 106-3 that face the first face-constituting base fabric 111 by stitching. The other faces of the slide tether leg piece portions 106-2, 106-3 have smooth surface except having stitching lines for fixing the stopper pieces 106-5. FIG. 16 shows a state that the slide tether leg piece portion 106-2, 106-3 are pulled and moved backward toward the vent hole 105, and FIG. 17 is a sectional view of section I-I of FIG. 16. The turn-over portions 106-7 can abut to the edges of the slits 130-1, 130-2 when the slide tether leg piece portions 106-2, 106-3 go backward, to hold the slide tether leg piece portion 106-2, 106-3 to stop. Thereby the stopper pieces 106-5 restrict backward motion of the slide tether 106 toward the vent hole. And certain size of passage ways for gas flow out shown in arrows X,Y,Z can be achieved, and prevent them to go larger.

A material constructing a woven fabric of the airbag according to the embodiment of the present invention is not particularly limited, but may employ a material which has a high strength, is inexpensive and is generally available, for example, nylon 6, nylon 66, nylon 46, nylon 610 and nylon 612 or the like. Furthermore, the airbag in the embodiment of the present invention is not limited to the configuration which deploys from the front side of the vehicle to the rear side, and protects the occupant, but can be applied to all the vehicles equipped with an appropriate airbag which is necessary to inflate and deploy like a surface shape along a predetermined direction.

As described above, according to the present invention, in the airbag device having the hollow airbag which constrains the occupant by being deployed by the gas supplied form the inflator, and which includes the first face-constituting base fabric facing to the side of the occupant, and the second face-constituting base fabric facing the side opposite to the occupant. The airbag includes the vent hole which is provided in the second face-constituting base fabric, for discharging the gas. The slide tether is provided from the inner surface of the second face-constituting base fabric to the inner surface of the first face-constituting base fabric, and performs transition of the state of the vent hole, from the open state via the close state to the open state. The slide tether cover is provided with the opening communicated with the vent hole, its one end is fastened to the inner surface of the second face-constituting base fabric via the slide tether. The slide tether cover guides the slide tether. The slide tether is constructed by the body portion, the bifurcated portions which are bifurcated from one end portion in the longitudinal direction of the body portion, and the leg piece portions which are respectively extended from the bifurcated portions. The other end portion in the longitudinal direction of the body portion constitutes the first supporting point by being fastened to the inner surface of the second face-constituting base fabric in the direction going from the vent hole toward the mounting position of the inflator. The bifurcated portions construct the second supporting point by the other end portion of the slide tether cover being fastened to the inner surface of the second face-constituting base fabric. The extended terminal end portions of the leg piece portions construct the third supporting point by being respectively fastened to the inner surface of the first face-constituting base fabric. When the airbag is deployed, transition of a state of the vent hole is performed on the basis of a force acting in the airbag deploying direction which is generated with the first supporting point and the third supporting point as a starting point, and the force acting in the direction intersecting with the airbag deploying direction which is generated while beginning at the second supporting point. As a result, it is possible to obtain the airbag which increases the amount of energy absorption in the early stage of constraining the occupant by enhancing the accumulation pressure of the inflating gas in the early state of the deployment, and can hold down the output of the inflating gas of the inflator by raising the energy absorption efficiency.

Hereinbefore, there has been given the description of the present invention based on the preferable embodiments of the present invention. The present invention has been described here by showing the particular specific examples, but these can be variously modified and changed without departing from the spirits and scope of the present invention defined in claims.

The present invention claims priority based on Japanese Patent Application No. 2012-263586 filed on Nov. 30, 2012, and Japanese Patent Application No. 2013-032480 filed on Feb. 21, 2013, and all the contents of these two applications are incorporated herein by reference.

What is claimed is:

1. An airbag device having a hollow airbag which constrains an occupant by being deployed by gas supplied by an inflator, and which includes a first face-constituting base fabric facing a side of the occupant, and a second face-constituting base fabric facing a side opposite to the occupant, the airbag comprising:
  a vent hole which is provided in the second face-constituting base fabric, for discharging the gas;
  a slide tether which is provided from an inner surface of the second face-constituting base fabric to an inner surface of the first face-constituting base fabric, and which performs transition of a state of the vent hole, from an open state via a close state to the open state, by changing between a slackened state and an extended state;
  a slide tether cover which is provided with an opening communicated with the vent hole, one end of which is fastened to the inner surface of the second face-constituting base fabric at an inner peripheral side of the vent hole via a body portion of the slide tether, the other end of which is fastened to the inner surface of the second face-constituting base fabric at an outer peripheral side of the vent hole, and which guides the slide tether; and
  a joint capable of being separated by a predetermined pressure of the gas and formed in the first face-constituting base fabric and the second face-constituting base fabric, both in the outer peripheral side of the vent hole,
  wherein the slide tether includes the body portion, bifurcated portions which are bifurcated from one end portion in a longitudinal direction of the body portion, and leg piece portions which are respectively extended from the bifurcated portions,
  wherein the other end portion in the longitudinal direction of the body portion constitutes a first supporting point by being fastened to an inner surface of the second face-constituting base fabric in a direction going from the vent hole toward a mounting position of the inflator,
  wherein the bifurcated portions constitute a second supporting point by the other end portion of the slide tether cover being fastened to the inner surface of the second face-constituting base fabric,
  wherein extended terminal end portions of the leg piece portions constitute a third supporting point by being respectively fastened to the inner surface of the first face-constituting base fabric, and wherein, when the airbag is deployed, transition of a state of the vent hole is performed based on a force acting in an airbag deploying direction which is generated with the first supporting point and the third supporting point as a starting point, and a force acting, in a direction going from a center portion of the airbag toward an outer peripheral portion of the airbag and intersecting with the airbag deploying direction, which is generated with the second supporting point as a starting point.

2. The airbag device according to claim 1, wherein the vent hole is provided near an insertion hole of the inflator.

3. An airbag device having a hollow airbag which constrains an occupant by being deployed by gas supplied by an inflator, and which includes a first face-constituting base fabric facing a side of the occupant, and a second face-constituting base fabric facing a side opposite to the occupant, the airbag device comprising:

a vent hole which is provided in the second face-constituting base fabric, for discharging the gas;

a slide tether which is provided from an inner surface of the second face-constituting base fabric to an inner surface of the first face-constituting base fabric, and which performs transition of a state of the vent hole, from an open state via a close state to the open state, by changing between a slackened state and an extended state;

a stopper piece which is arranged on the slide tether and restricts backward motion of the slide tether toward the vent hole; and a slide tether cover which is provided with an opening communicated with the vent hole, one end of which is fastened to the inner surface of the second face-constituting base fabric, and which guides the slide tether, wherein the slide tether includes a body portion, bifurcated portions which are bifurcated from one end portion in a longitudinal direction of the body portion, and leg piece portions which are respectively extended from the bifurcated portions, wherein the other end portion in the longitudinal direction of the body portion constitutes a first supporting point by being fastened to an inner surface of the second face-constituting base fabric in a direction going from the vent hole toward a mounting position of the inflator, wherein the bifurcated portions constitute a second supporting point by the other end portion of the slide tether cover being fastened to the inner surface of the second face-constituting base fabric, wherein extended terminal end portions of the leg piece portions constitute a third supporting point by being respectively fastened to the inner surface of the first face-constituting base fabric, and wherein, when the airbag is deployed, transition of a state of the vent hole is performed based on a force acting in an airbag deploying direction which is generated with the first supporting point and the third supporting point as a starting point, and a force acting, in a direction intersecting with the airbag deploying direction, which is generated with the second supporting point as a starting point.

\* \* \* \* \*